Patented June 29, 1937

2,085,134

UNITED STATES PATENT OFFICE 2,085,134

BUTTER SUBSTITUTE

Herman D. Wendt, deceased, late of West Chester, Pa., by Ada R. Wendt, administratrix, Coudersport, Pa., assignor to Milk Processes, Inc., Philadelphia, Pa., a corporation of Pennsylvania No Drawing. Application March 15, 1935,
Serial No. 11,209

6 Claims. (Cl. 99—123)

The present invention relates to butter substitute and a method of preparing a product of this character. It is closely related to the subject matter of the prior Patents Reissue No. 19,123 and No. 1,791,069. In these patents there are described and claimed a new super cream product containing a concentration of at least 65% butter fat in the dispersed phase and processes of manipulation of a super cream of this character in order to produce butter and other products therefrom. The present invention rests upon the discovery that a super cream product containing butter fat of a concentration in the general range of the concentration involved in ordinary butter, and having the taste and other desirable characteristics of butter, can be produced from a super cream of this character without reversal of the phase of the cream to produce butter.

In the practice of the present invention, ingredients adapted to be blended with the super cream of the prior patents are added to a milk product containing butter fat in the dispersed phase before or subsequent to concentration of such milk product to produce the concentrated cream product of my prior invention and the concentrated cream product is thereafter used as a butter substitute without reversal of phase thereof. These ingredients may be such as to produce a super cream having the base of sweet or acid butter and may comprise starter or starter substitutes, salt, or other flavoring material. It is found that, by the addition to a cream product of the character described and claimed in Reissue Patent 19,123, of the desired flavoring materials, there can be produced a product which cannot be readily distinguished from ordinary butter. In this connection the addition of certain other substances, such as gelatine and/or an alkali metal salt of citric acid, has been found to produce a product of smooth texture which can be readily spread upon bread or other foodstuffs and which affords, when so blended, a product having all of the desired characteristics of an ordinary butter.

In the practice of the invention a milk product containing milk fat in the dispersed phase, such as ordinary whole milk or cream may be first warmed to render its butter fat fluid and thereafter subjected to centrifugal concentration to produce a cream containing between 65 and 85% butter fat concentration. This cream, while still in the liquid form, is thereafter blended with the desired flavoring substances, such as starter, salt, etc., and may be colored and also blended with gelatine, sodium citrate or some other plasticizer, to produce a product which, when cooled, to a condition of plasticity, can be spread with the same facility as butter and which yields a product which is comparable with butter in palatability and other desired characteristics.

Instead of adding the flavoring substances and plasticizer to the concentrated cream product, these materials can be added to the whole milk or cream from which this concentrated product is produced. In this latter instance, they blend with the liquid vehicle and constitute a part of the super cream produced as the result of the centrifugal separating treatment. In connection with this last mentioned alternative operation, the citrate and gelatine have the additional advantage that they tend to stabilize the curd and fat of the milk product during the centrifugal concentration thereof and therefore tend to maintain the desired degree of dispersion of the butter fat particles and produce a super cream product which, when cooled to a condition of plasticity, has an unusually smooth and even texture. It has been found that plastic cream produced in accordance with prior patent Reissue 19,123 and containing in addition to the natural ingredients described in that patent a proportion of gelatine amounting to from 0.1% to 0.3% of the total content of such cream and/or a proportion of sodium citrate amounting to from 0.1% to 0.3% of the total content of such cream is considerably superior from the standpoint of smoothness of texture to cream produced in accordance with the prior patent. In cases in which the gelatine and/or sodium citrate are added to whole milk or cream prior to its concentration, these products will have to be added in greater proportions than those above indicated, as they blend with the liquid vehicle of which a large proportion is removed and the quantity of these products remaining in the ultimately produced cream will, accordingly, be very considerably smaller than that originally added to the milk or cream prior to concentration.

Modifications will be obvious to those skilled in the art and it is not therefore desired to be limited except by the scope of the sub-joined claims.

What is claimed is:

1. A butter substitute comprising a plastic cream containing butter fat in the dispersed phase in a concentration of 65 to 85% in a liquid vehicle and a small proportion of an alkali metal salt of citric acid.

2. A butter substitute comprising a plastic cream containing butter fat in the dispersed phase in a concentration of 65 to 85% in a liquid vehicle and a proportion of an alkali metal salt of citric acid constituting from 0.1 to 0.3% of the composition.

3. A butter substitute comprising a plastic cream containing butter fat in the dispersed phase in a concentration of 65 to 85% in a liquid vehicle, an alkali metal salt of citric acid and gelatine.

4. A butter substitute comprising a plastic cream containing butter fat in the dispersed phase in a concentration of 65 to 85% in a liquid vehicle, a proportion of an alkali metal salt of citric acid constituting from 0.1 to 0.3% and a proportion of gelatine constituting from 0.1 to 0.3% of the composition.

5. The method of producing a butter substitute which comprises adding to a milk product containing butter fat in the dispersed phase a relatively small proportion of an alkali metal salt of citric acid, thereafter centrifuging the product so produced to a concentration of over 65% butter fat content and finally cooling the product so produced to a condition of plasticity.

6. The method of producing a butter substitute which comprises adding to a milk product containing butter fat in the dispersed phase a relatively small proportion of gelatine and an alkali metal salt of citric acid, thereafter centrifuging the product so produced to a concentration of over 65% butter fat content and finally cooling the product so produced to a condition of plasticity.

ADA R. WENDT,
Administratrix of the Estate of Herman D. Wendt, Deceased.